(12) United States Patent
Barton (10) Patent No.: US 9,822,004 B2
(45) Date of Patent: Nov. 21, 2017

(54) HYDROGEN GENERATOR WITH LOCKING DOOR

(71) Applicant: Intelligent Energy Inc., San Jose, CA (US)

(72) Inventor: Russell H. Barton, New Westminster (CA)

(73) Assignee: INTELLIGENT ENERGY INC., San Jose, CA (US)

( * ) Notice: Subject to any disclaimer, the term of this patent is extended or adjusted under 35 U.S.C. 154(b) by 121 days.

(21) Appl. No.: 14/816,027

(22) Filed: Aug. 2, 2015

(65) Prior Publication Data

US 2015/0340718 A1    Nov. 26, 2015

Related U.S. Application Data

(63) Continuation of application No. PCT/US2013/026100, filed on Feb. 14, 2013.

(51) Int. Cl.
*C01B 3/02* (2006.01)
*B01J 19/24* (2006.01)
(Continued)

(52) U.S. Cl.
CPC    *C01B 3/02* (2013.01); *B01J 3/03* (2013.01); *B01J 19/24* (2013.01); *C01B 3/0005* (2013.01);
(Continued)

(58) Field of Classification Search
CPC ......... C01B 3/0005; C01B 3/04; C01B 3/065; C01B 3/02; F16J 13/24
See application file for complete search history.

(56) References Cited

U.S. PATENT DOCUMENTS

| 1,858,013 A | 5/1932 | Heins |
| 7,670,706 B2 | 3/2010 | Yamamoto et al. |

(Continued)

FOREIGN PATENT DOCUMENTS

| EP | 0337528 A2 | 10/1989 |
| JP | 2009-140853 A | 6/2009 |
| WO | WO 2006/069324 A1 | 6/2006 |

OTHER PUBLICATIONS

International Patent Application No. PCT/US2013/026100; Int'l Search Report and the Written Opinion; dated Nov. 7, 2013; 11 pages.

*Primary Examiner* — Matthew Merkling
(74) *Attorney, Agent, or Firm* — Baker & Hostetler LLP (57) ABSTRACT

Disclosed is a hydrogen generator with a door that can be opened to replace a fuel unit and closed to seal the door. A lock responds directly to pressure within the chamber to prevent opening when the pressure exceeds a threshold value. The lock includes a locking member with a lug that engages a retainer to seal the door when the door is locked and is disengaged from the retainer when the door is unlocked. An opening mechanism moves the locking member to lock and unlock the door. A movable key is engaged with the opening mechanism and the locking member when the pressure in the chamber is at or below the threshold value and disengaged from one of the opening mechanism and the locking member by an actuator (e.g., a flexible diaphragm) so the door cannot be unlocked and opened when the pressure is above the threshold value.

12 Claims, 4 Drawing Sheets

(51) Int. Cl.
  *F16J 13/24* (2006.01)
  *B01J 3/03* (2006.01)
  *C01B 3/04* (2006.01)
  *C01B 3/00* (2006.01)
  *C01B 3/06* (2006.01)
  *H01M 8/065* (2016.01)
  *H01M 8/04082* (2016.01)

(52) U.S. Cl.
  CPC ............... *C01B 3/04* (2013.01); *C01B 3/065* (2013.01); *H01M 8/04208* (2013.01); *H01M 8/065* (2013.01); *Y02E 60/324* (2013.01); *Y02E 60/362* (2013.01); *Y02E 60/364* (2013.01)

(56) References Cited

U.S. PATENT DOCUMENTS

| 8,235,077 | B2 | 8/2012 | Curello et al. |
| 2004/0076561 | A1* | 4/2004 | Kajiura .................. B01J 20/20 422/187 |
| 2010/0278722 | A1 | 11/2010 | Field |

\* cited by examiner

HYDROGEN GENERATOR WITH LOCKING DOOR

CROSS-REFERENCE TO RELATED APPLICATIONS

This patent application is a Continuation of international patent application PCT/US2013/026100 filed Feb. 14, 2013, the disclosures of which are incorporated by reference in its entirety.

TECHNICAL FIELD

This invention relates to a hydrogen generator with a door that cannot be opened when pressure within the hydrogen generator exceeds a threshold value.

BACKGROUND

Interest in fuel cell batteries as power sources for portable electronic devices has grown. A fuel cell is an electrochemical cell that uses materials from outside the cell as the active materials for the positive and negative electrode. Because a fuel cell does not have to contain all of the active materials used to generate electricity, the fuel cell can be made with a small volume relative to the amount of electrical energy produced compared to other types of batteries.

In some types of hydrogen fuel cells, hydrogen is formed from a hydrogen-containing fuel supplied to the negative electrode side of the fuel cell. In other types of hydrogen fuel cells, hydrogen gas is supplied to the fuel cell from a source outside the fuel cell. A fuel cell system can include a fuel cell battery, including one or more fuel cells (e.g., a fuel cell stack), and a fuel source, such as a fuel tank or a hydrogen generator. Hydrogen generators that supply hydrogen gas to a fuel cell can be an integral part of a fuel cell system, or they can be removably coupled to the fuel cell system. A removable hydrogen generator can be replaced with another one when the hydrogen containing materials have been consumed. Removable hydrogen generators can be disposable (intended for only a one-time use). Both removable and permanently installed hydrogen generators can be refillable (intended for use multiple times) to replace consumed fuel composition.

Hydrogen generators can produce hydrogen using a variety of hydrogen containing materials and a variety of methods for initiating the hydrogen generating reactants. For example, hydrogen gas can be released when a hydrogen-containing material is heated, when a hydrogen-containing material reacts with another reactant, or when a hydrogen-containing material comes in contact with a catalyst.

A hydrogen generator is generally sealed to prevent leakage of hydrogen gas to the external environment, and hydrogen gas is released in a controlled manner to the apparatus being supplied with hydrogen. Hall of the hydrogen gas is not released as it is produced, pressure can build up within the hydrogen generator. To provide the maximum quantity of hydrogen and avoid unsafe leakage, it is desirable for the hydrogen generator to remain sealed during use. For hydrogen generators with replaceable cartridges of hydrogen-containing material or other reactants, means of access to the hydrogen generator to replace cartridges must therefore be restricted. To prevent leakage of hydrogen gas as a result of deformation or damage to sealing components due to the internal pressure, the hydrogen generator can be made from materials that are resistant to the expected internal pressures. However, this can require using heavier or thicker components or expensive materials.

In view of the above, an object of the present invention is to provide a hydrogen generator that will remain sealed during use and withstand the expected internal pressures, while having a simple design that is easy and economical to manufacture.

SUMMARY

One or more of the above objects are met and one or more of the above disadvantages of hydrogen generators can be overcome by providing a door that can be opened to access and replace a fuel cartridge, that cannot be opened while the hydrogen generator is in use and the internal pressure exceeds a threshold value, and that has a seal that remains effective even when some deformation of sealing components occurs.

Accordingly, an aspect of the present invention is a hydrogen generator including a chamber configured to removably contain a fuel cartridge, a wall, and a door that is openable to provide access to the chamber when the door is in an open position and closable to provide a seal between the door and the wall when the door is in a closed position. The door includes a lock that is directly responsive to a pressure within the chamber to prevent opening of the door when the pressure within the chamber exceeds a threshold value. The lock includes a locking member with a lug that is engaged with a retainer to seal the door to the wall when the locking member is in a locked position and is disengaged from the retainer when the locking member is in an unlocked position. The lock further includes an opening mechanism for moving the locking member between the unlocked and locked positions. A movable key is engaged with the opening mechanism and the locking member when the pressure in the chamber is at or below the threshold value and disengaged from one of the opening mechanism and the locking member when the pressure is above the threshold value. Embodiments of the hydrogen generator can include one or more of the following features:
- the locking member includes a plurality of lugs;
- the opening mechanism is manually operable;
- the opening mechanism is rotatable;
- the key is biased by a spring to engage the opening mechanism and the locking member and is moveable against the spring by an actuator in fluid communication with the pressure in the chamber to disengage the key from one of the opening mechanism and the locking member;
- the door is sealable against an end of the wall; the end of the wall can include a sealing flange; the wall can be a chamber wall; the wall can be a housing wall disposed outside a chamber wall;
- the door includes a door body facing the chamber and a door front facing away from the chamber when the door is in the closed position; the opening mechanism can be movably retained between the door body and the door front;
- the key has a shaped portion that corresponds to a shape of a keyhole in the locking member and to a shape of a feature in the opening mechanism; the shaped portion of the key is disengaged from the keyhole when the pressure in the chamber exceeds the threshold value;
- the threshold value is no greater than 5 atmospheres above a standard atmospheric pressure; the threshold value can be no greater than 2 atmospheres above the standard atmospheric pressure; the threshold value can be no greater than 1 atmosphere above the standard atmospheric pressure;

a seal member provides a seal between the door and the wall when the door is in the closed position;

the lug can shear when the pressure exceeds a predetermined limit;

the hydrogen generator includes a hydrogen outlet to release hydrogen gas from the chamber when the door is the closed position; the outlet can include a one-way valve; the release can be controlled by a controller;

the chamber is configured to contain a fuel cartridge; the fuel cartridge can be a replaceable fuel cartridge that is accessible when the door is in the open position; the hydrogen generator can be configured to contain a plurality of fuel cartridges; the plurality of fuel cartridges can be contained in a single chamber; the plurality of fuel cartridges can be contained in a plurality of chambers;

the fuel cartridge contains a hydrogen-containing material that can release hydrogen gas when heated, and the hydrogen generator includes a heat source for heating the hydrogen-containing material; and the fuel cartridge contains a first reactant that can react to release hydrogen gas when the reactant is in contact with at least one of a second reactant and a catalyst, and at least one of the first reactant, the second reactant and the catalyst is movable within the hydrogen generator.

These and other features, advantages and objects of the present invention will be further understood and appreciated by those skilled in the art by reference to the following specification, claims and appended drawings.

Unless otherwise specified, the following definitions and methods are used herein:

"directly responsive to pressure" means acting as a direct result of pressure rather than indirectly, such as through an intermediate electronic device.

Unless otherwise specified herein, all disclosed characteristics and ranges are as determined at room temperature (20-25° C.).

DESCRIPTION

A hydrogen generator according to the invention has a chamber in which a replaceable fuel cartridge can be inserted. The fuel cartridge contains one or more hydrogen-containing materials that can release hydrogen gas. The hydrogen generator has a door that can be opened to provide access to the chamber, so a fuel cartridge can be inserted and removed. As used herein, the term "door" can be any suitable structure that can be opened and closed, e.g., by pivoting on one or more hinges, sliding in a track, or removing and replacing. The door can be closed to contain the fuel cartridge in the chamber and to seal the hydrogen generator to contain hydrogen gas that is generated. When the door is in a closed position, it seals against a wall of the hydrogen generator. The wall can be a wall of the chamber, or it can be a wall of a housing that contains the chamber. The door can be sealed to an end of the wall or to a feature such as a flange or shoulder in the wall. To increase the sealing area between the door and the wall, one or both of the perimeter of the door and the end of the wall may include a flange, shoulder or other feature, preferably creating a surface that is perpendicular to or nearly perpendicular to the adjacent portion of the wall. This feature can add strength to the wall to minimize deformation when the hydrogen generator is pressurized, make the seal less sensitive to minor dimensional changes resulting from changes in pressure, and provide a large surface against which to seal.

The door includes a lock to keep the door closed and sealed when pressure within the hydrogen generator exceeds a threshold value, such as during or after hydrogen gas is produced and before sufficient hydrogen gas is removed to reduce the pressure to or below the threshold value. The lock is a pressure-responsive mechanical lock that responds directly to a high pressure on one side of the lock to prevent the door from being unsealed or opened when the pressure is above the threshold value. For example, the lock can have a mechanical actuator that can move as a direct result of a pressure within the hydrogen generator (e.g., without requiring an intermediate electronic device). At lower pressures the lock does not prevent unlocking of the door, so the door can be unsealed and opened. This prevents hydrogen gas from being inadvertently released to the outside environment, wasting hydrogen gas that has been produced and creation of a potentially dangerous situation, such as an explosion or fire.

The lock includes a locking member with one or more projecting parts (i.e., lugs) protruding therefrom. When the locking member is oriented in an unlocked position, movement of the door to open or close it is not restricted. When the locking member is moved into a locked position, each of the lugs is moved into engagement with a retainer in an adjacent part of the hydrogen generator, and the retainer cooperates with the lug to hold the door tightly closed, providing a seal between the door and the hydrogen generator wall. To open the door, the locking member is moved to the unlocked position, disengaging each of the lugs from the corresponding retainer. The retainer can be located in a part of the hydrogen generator adjacent to the door, such as in a wall of the chamber or hydrogen generator housing. The retainer can be a structure such as a receptacle, cavity, groove, slot, aperture, depression, recess or projection that can cooperate with the lug to hold the door closed. The locking member can be moved between the unlocked and locked positions by rotating, sliding or other suitable movement. The locking member can be in the form of a plate, for example, with one or more lugs in the form of pins, latches, hooks or other structures protruding from its edges that are capable of engaging the retainers.

An opening mechanism is used to move the locking member between the unlocked and locked positions. Suitable mechanisms can include one or a combination of a knob, a slide and a lever, for example. The opening mechanism can move by sliding or rotating and can be operated manually or electronically, for example.

When the pressure within the hydrogen generator is at or below the threshold value, a movable key is engaged with both the opening mechanism and the locking member such that moving the opening mechanism moves both the key and the locking member. When the pressure within the hydrogen generator is above the threshold value, the key is out of engagement with one of the opening mechanism and the locking member such that moving the opening mechanism does not move the locking member. In one example, engagement between the key and the locking member can be maintained at low pressures by biasing the key toward the locking member, so a shaped portion of the key is positioned within a similarly shaped structure (e.g., a keyhole) in the locking member. In another example, engagement between the key and the opening mechanism can be maintained at low pressures by biasing the key toward the opening mechanism, so a shaped portion of the key is positioned within a similarly shaped structure (e.g., a keyhole) in the opening mechanism. In both of these examples, when the pressure increases above the threshold value, a pressure-responsive actuator in fluid communication with the pressure in the hydrogen generator can push the key against the force of the biasing spring, so the shaped portion of the key is separated from the similarly shaped portion of the locking member or the opening mechanism so that operating the opening mechanism does not result in movement of the locking member from the locked position to the unlocked position. The pressure-responsive actuator can include a flexible diaphragm that will flex outward in response to a pressure in the hydrogen generator above the threshold valve and return to an unflexed position when the pressure drops to or below the threshold value. Additional linkage may be provided between the actuator and the key. For example, if the actuator is a flexible diaphragm, the linkage can be a diaphragm follower between the diaphragm and the key.

To provide for a more effective seal between the door and the wall, a sealing member (e.g., a gasket or grommet) may be disposed therebetween. The sealing member is preferably made from an elastomeric material that will withstand expected temperatures and can conform to irregularities in the sealing surfaces of the door and the wall.

The chamber can have a wall. This can be the wall of the hydrogen generator against which the door can be sealed, or the door can be sealed against another wall of the hydrogen generator, such as a wall of an outer housing that contains the chamber. Because heat may be used to initiate the production of hydrogen, or heat may be produced during the release of hydrogen gas, it may be desirable to provide thermal insulation around the chamber, such as between the chamber and housing walls. It may also be desirable to provide the door with thermal insulation.

The hydrogen generator can use a variety of hydrogen-containing materials and methods of releasing hydrogen therefrom. For example, a liquid can react with another liquid or a solid to produce hydrogen gas. The reaction can be a hydrolysis reaction between water and another compound (e.g., a metal hydride or borohydrate) in either solid or liquid form. Another method of producing hydrogen gas is by heating a hydrogen-containing material, such as by desorption (e.g., from an $AB_5$ or $AB_2$ type hydrogen storage alloy) or by a thermal decomposition reaction of a metal hydride (e.g., aluminum hydride). One or more consumable materials is contained within fuel units that can be inserted into the hydrogen generator chamber and replaced after use with fresh fuel units. When a liquid reactant must be transferred from one location to another within the hydrogen generator, the transfer may be accomplished using a pump disposed within or outside the hydrogen generator. When a hydrogen-containing material must be heated to release hydrogen gas, one or more heat sources can be included in the hydrogen generator, preferably in the chamber in contact with the fuel unit.

Because the hydrogen generator becomes pressurized with hydrogen gas during use, it may be desirable to provide a means of relieving pressure if the internal pressure exceeds a predetermined safe limit, e.g., to prevent permanent damage to the hydrogen generator or an explosion. This can be accomplished by including a pressure relief vent in the hydrogen generator, or the door can be designed so that the lugs will shear and the door will open if the predetermined pressure limit is exceeded. In embodiments in which the door has multiple lugs (e.g., four), two adjacent lugs can be designed to shear at a lower pressure than the others, so the door can vent at one or two edges so the door will still be retained in the hydrogen generator by the remaining lugs.

Figure 1A:
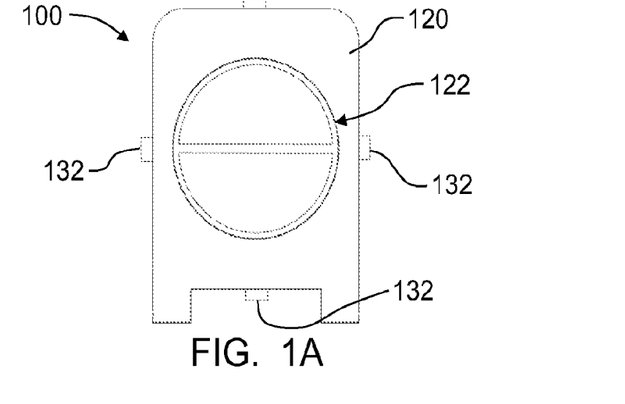
FIG. 1A is a front plan view of an embodiment of a door with a locking mechanism.
Figure 1B:
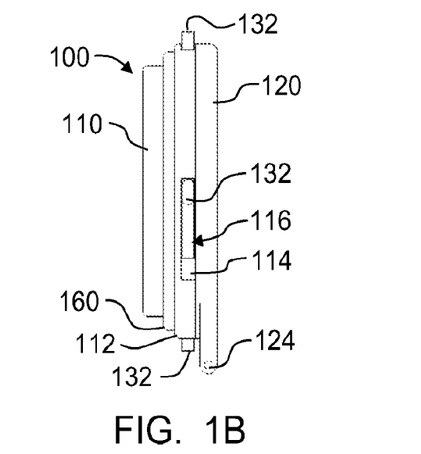
FIG. 1B is a side plan view of the door in FIG. 1A.
Figure 1C:
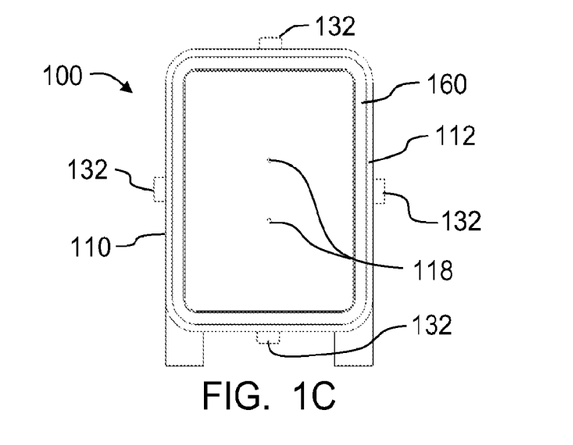
FIG. 1C is a rear plan view of the door in FIG. 1A.
Figure 2A:
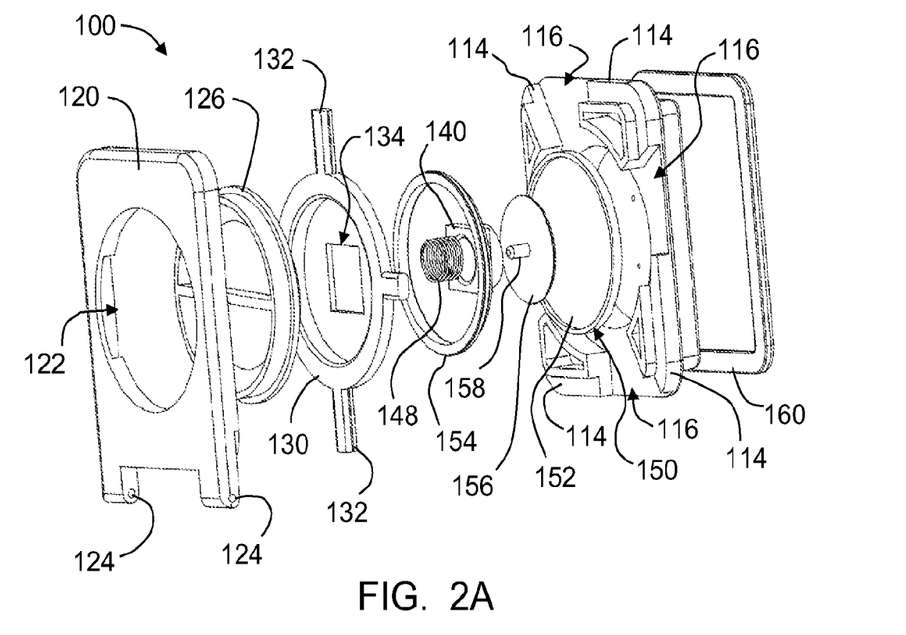
FIG. 2A is an exploded front perspective view of the door in FIG. 1A.
Figure 2B:
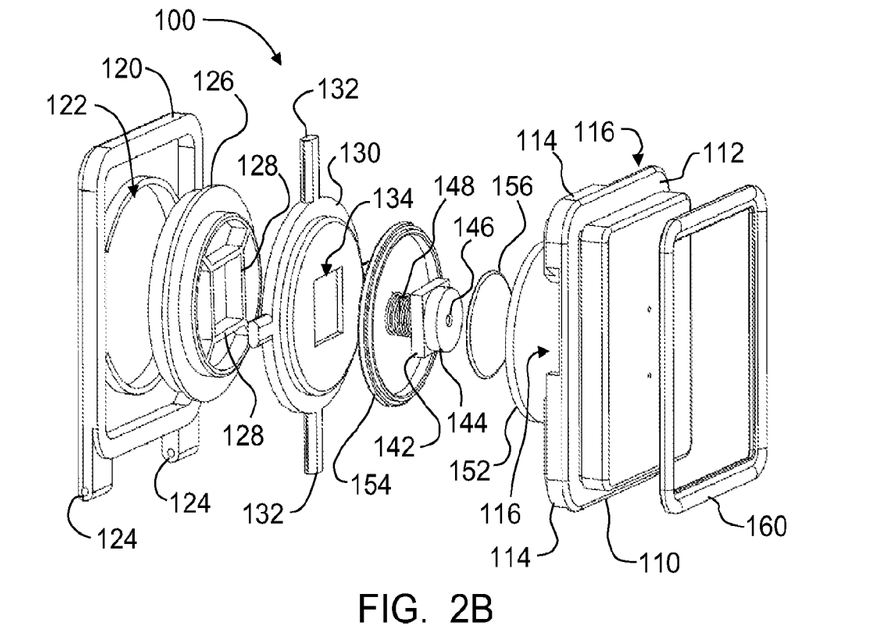
FIG. 2B is an exploded rear perspective view of the door in FIG. 1A.

An embodiment of a door and a hydrogen generator including the door is shown in the accompanying drawings. Various plan views of the door (outside or front, side, and inside or rear) are shown in FIGS. 1A to 1C, and two exploded perspective views of the door are shown in FIGS. 2A and 2B. In the description below, "inside" refers to the sides of components that face toward the hydrogen generator chamber when the door is closed, "outside" refers to the sides of components that face away from the hydrogen generator chamber, and the "front" of the door is the outside portion of the door.

Door 100 includes a door body 110 and a door front 120. A seal member 160 is disposed on the rear of the door 100, against a peripheral flange 112 of the door body 110. Disposed between the door body 110 and door front 120 is a locking member 130 with four lugs 132 that extend beyond the sides of the door body 110. The locking member 130 can be rotated sufficiently to move the lugs 132 between a fully extended position when the locking member 130 is in the locked position, as shown in the drawings, and a retracted position when the locking member 130 is in the unlocked position. Stops 114 in the door body 110 limit the rotational movement of the locking member 130 and define openings 116 within which the lugs 132 can move. An opening mechanism in the form of a knob 126 is disposed between the locking member 130 and the door front 120. The knob 126 is accessible from the outside of the door 100 through an aperture 122 in the door front 120 so the knob 126 can be rotated to lock and unlock the door 100. Walls 128 extend outward from the inside surface of the knob 126 to provide a square shaped structure for engaging a square portion 142 of a key 140 and rotating the key 140 when the knob 126 is rotated. The locking member 130 has a central keyhole 134. A spring 148 biases the key 140 away from the knob 126 sufficiently for the square portion 142 of the key 140 will engage the keyhole 134 as well as the walls 128 in the knob 126 under conditions when it is desirable to be able to move the locking member 130 between its locked and unlocked positions. When the door 100 is closed and sealed (locked), it is desirable to be able to unlock the door 100 when the internal pressure within the hydrogen generator is at or below a threshold value, and it is desirable to prevent unlocking the door 100 when the internal pressure is above the threshold value. When the internal pressure is above the threshold value, the key 140 is pushed against the force of the spring 148 to move the key 140 closer toward the knob 126 such that the round portion 144 of the key 140 is within the keyhole 134. In this position, the square portion 142 no longer engages the keyhole 134, so rotating the knob 126 will not move the locking member 130. The key 140 is pushed against the spring 148 toward the knob 126 by an actuator 150. The actuator includes a flexible diaphragm 152 in fluid communication with the inside of the hydrogen generator via through holes 118 in the door body 110. As pressure against the inside surface of the diaphragm 152 increases, the diaphragm 152 is pushed outward against the pressure of the spring 148. When the pressure against the inside of the diaphragm 152 exceeds the threshold value, the force of the spring 148 is overcome, and the diaphragm flexes outward to push the key 140 toward the knob 126 until the round portion 144 rather than the square portion 142 of the key is within the keyhole 134. A follower 156 can be disposed between the diaphragm 152 and the key 140 to protect the diaphragm 152. A guide pin 158 extending from the follower 156 and into a central hole 146 in the key 140 can retain the follower 156 between the diaphragm 152 and the key 140. A retainer 154 that cooperates with the door body 110 retains the edges of the diaphragm 152 against the door body 110. Hinge pin holes 124 can be provided in the door 100 (in the door front 120 as shown in the drawings) to allow the door 100 to be mounted to the hydrogen generator.

Figure 3A:
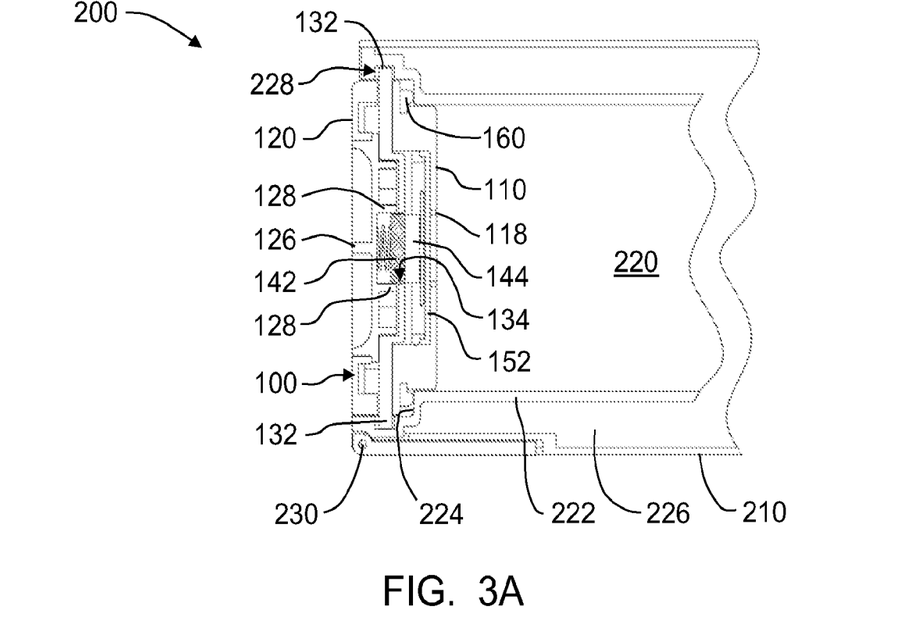
FIG. 3A is a partial cross-sectional side view of a hydrogen generator including the door in FIG. 1A when the pressure within the hydrogen generator is at or below a threshold value.
Figure 3B:
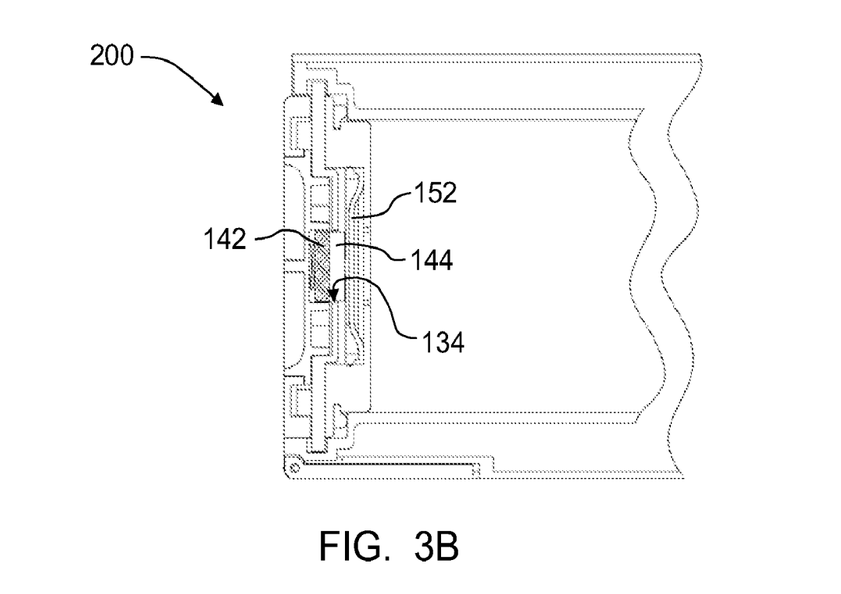
FIG. 3B is a partial cross-sectional side view of the hydrogen generator in FIG. 3A when the pressure within the hydrogen generator is above a threshold value.

FIGS. 3A and 3B show a portion of a hydrogen generator 200 to which the door 100 is mounted, with the door 100 closed to provide a seal between the door 100 and the hydrogen generator 200. The hydrogen generator 200 includes a housing 210, containing a chamber 220 into which a fuel cartridge (not shown) can be removably inserted. The chamber 220 includes a wall 222. The open end of the wall 222 includes a flange 224, providing a wide sealing surface for the door 100, and recessed areas 228 that serve as retainers for lugs 132. The door 100 is attached to the housing 210 with a hinge pin 230.

In FIG. 3A the pressure within the hydrogen generator 200 is at or below a threshold value. The diaphragm 152 is disposed against the door body 110, in a recessed area therein, with the key 140 biased away from the inside surface of the knob 126 so the square portion 142 (shown with cross-hatching) of the key 140 is engaged with the keyhole 134 in the locking member 130 so that rotating the knob 126 will move the locking member 130 and lugs 132 from the locked position (shown in the drawings) to the unlocked position.

In FIG. 3B the pressure within the hydrogen generator 200 is above the threshold value. The diaphragm 152 is disposed against the adjacent surface of the door body 110, with the edges of the diaphragm 152 held against the door body 110 by the retainer 154, and the central portion of the diaphragm 152 in fluid communication with the chamber 220 via through holes 118 in the door body 110. The pressure in the chamber is sufficient to flex the diaphragm 152 away from the door body 110 and push the key 140 against the force of the spring 148 so the key 140 moves toward the knob 126 until the square portion 142 is disengaged from the keyhole, and the round portion 144 is disposed within the keyhole 134 so that the round portion 144 will turn freely, without causing the locking member 130 to rotate when the knob 126 and key 140 are turned. In this way the door 100 remains locked and sealed against the flange 224 in the chamber wall 222 when the chamber 220 is pressurized with hydrogen gas. The hydrogen gas can be released from the hydrogen generator in a controlled manner to a hydrogen consuming apparatus (not shown) through a hydrogen outlet (not shown).

Figure 4:
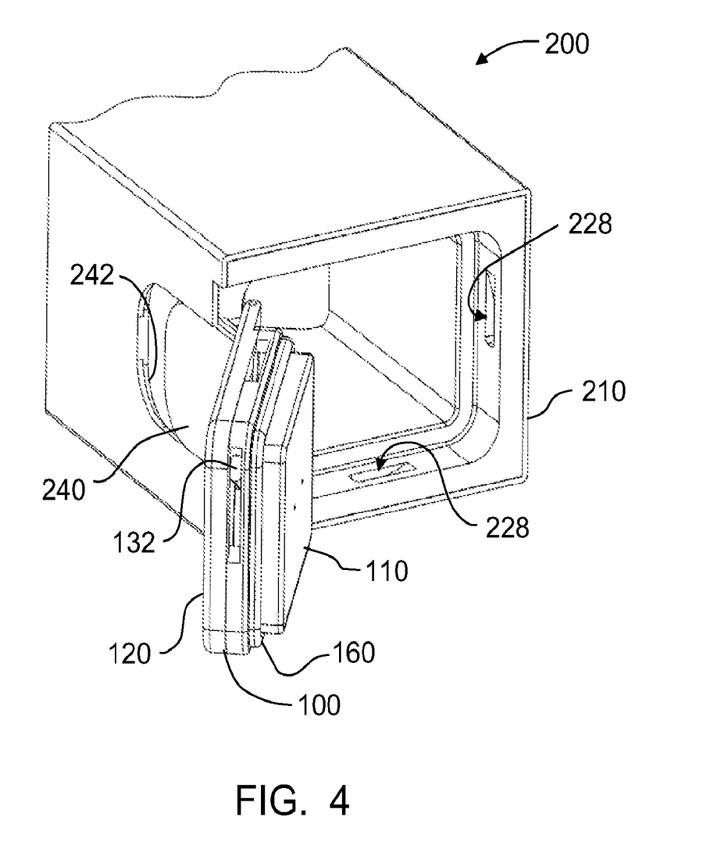
FIG. 4 is a partial perspective view of the hydrogen generator in FIGS. 3A and 3B, with the door open.

FIG. 4 shows an embodiment of the hydrogen generator 200 in FIGS. 3A and 3B, but with the door 100 unlocked and open. As oriented in FIG. 4, the bottom of the hydrogen generator 200 as shown in FIGS. 3A and 3B is on the left side. The door 100 is mounted to a dovetailed slide 240, that can slide outward in a corresponding groove 242 in the housing 210 when the door 100 is unlocked, so that the hinge does not affect the clearances between the door 100 and the housing 210, and the door 100 will pivot freely on the hinge when the door 100 and slide 240 are slid outward.

While only a single embodiment of a hydrogen generator and a door are shown in the drawings, other embodiments are possible in which modifications can be made consistent with the above disclosure.

All references cited herein are expressly incorporated herein by reference in their entireties. To the extent publications and patents or patent applications incorporated by reference contradict the disclosure contained in the present specification, the present specification is intended to supersede and/or take precedence over any such contradictory material.

The invention claimed is:

1. A hydrogen generator comprising:
a chamber configured to removably contain a fuel cartridge;
a wall, the wall having:
a flange defining an opening through the wall; and
a plurality of recesses disposed into the flange;
a door configured to fit within the flange when in a closed position, the door is openable to provide access to the chamber when the door is in an open position and closable to provide a seal between the door and the flange when the door is in the closed position, wherein:
the door includes a lock that is directly responsive to a pressure within the chamber to prevent opening of the door when the pressure within the chamber exceeds a threshold value, the lock comprising:
a locking member comprising a plurality of lugs, each lug is configured to extend from the door and a engage a respective one of the plurality of recesses when in a locked position and the plurality of lugs are disengaged from the plurality of recesses when the locking member is in an unlocked position;
an opening mechanism for moving the locking member between the unlocked and locked positions; and,
a movable key engaged with the opening mechanism and the locking member when the pressure in the chamber is at or below the threshold value and disengaged from one of the opening mechanism and the locking member when the pressure is above the threshold value.

2. The hydrogen generator according to claim 1, wherein the opening mechanism is rotatable.

3. The hydrogen generator according to claim 1, wherein the key is biased by a spring to engage the opening mechanism, and the locking member and is moveable against the spring by an actuator in fluid communication with the pressure in the chamber to disengage the key from one of the opening mechanism and the locking member.

4. The hydrogen generator according to claim 1, wherein the door comprises a door body facing the chamber and a door front facing away from the chamber when the door is in the closed position.

5. The hydrogen generator according to claim 1, wherein the key comprises a shaped portion that corresponds to a shape of a keyhole in the locking member and to a shape of a feature in the opening mechanism, and the shaped portion of the key is disengaged from the keyhole when the pressure in the chamber exceeds the threshold value.

6. The hydrogen generator according to claim 1, wherein a seal member is disposed between a sealing surface of the door and a sealing surface of the wall when the door is in the closed position.

7. The hydrogen generator according to claim 1, wherein the lug can shear when the pressure exceeds a predetermined limit.

8. The hydrogen generator according to claim 1, wherein the chamber is configured to contain a fuel cartridge.

9. The hydrogen generator according to claim 8, wherein the fuel cartridge is a replaceable fuel cartridge that is accessible when the door is in the open position.

10. The hydrogen generator according to claim 8, wherein the hydrogen generator is configured to contain a plurality of fuel cartridges.

11. The hydrogen generator according to claim 1, wherein the hydrogen generator comprises a hydrogen outlet to release hydrogen gas from the chamber when the door is the closed position.

12. The hydrogen generator according to claim 1, wherein the fuel cartridge contains a hydrogen-containing material that can release hydrogen gas when heated, and the hydrogen generator comprises a heat source for heating the hydrogen-containing material.

\* \* \* \* \*